(12) United States Patent
Vogrig et al.

(10) Patent No.: US 7,654,389 B2
(45) Date of Patent: Feb. 2, 2010

(54) RIVET COLLATING SYSTEM INCLUDING RIVET HOLDER AND METHOD OF FORMING THE SAME

(75) Inventors: Joseph Vogrig, Naperville, IL (US); Edward C. Musil, Orland Park, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 67 days.

(21) Appl. No.: 10/823,878

(22) Filed: Apr. 14, 2004

(65) Prior Publication Data
US 2005/0230278 A1 Oct. 20, 2005

(51) Int. Cl.
*B65D 85/24* (2006.01)
(52) U.S. Cl. .................. 206/338; 206/341; 206/820
(58) Field of Classification Search .......... 206/338, 206/345–47, 349, 820, 382–3, 379, 486, 206/443, 446, 372–73, 340, 341, 343–347; 411/442–3, 2, 5; 264/277, 279; 24/31 R–31 V, 24/33 B
See application file for complete search history.

(56) References Cited

U.S. PATENT DOCUMENTS

| | | | |
|---|---|---|---|
| 1,263,218 A | 4/1918 | Fischer | |
| 1,747,390 A | 2/1930 | Robb | |
| 3,432,985 A * | 3/1969 | Halstead | 53/140 |
| 3,450,255 A | 6/1969 | Mosetich | |
| 3,679,266 A | 7/1972 | Jenkins | |
| 3,774,755 A | 11/1973 | Cast | |
| 3,779,373 A | 12/1973 | Maier | |
| 3,885,669 A | 5/1975 | Potucek | |
| 3,892,313 A * | 7/1975 | Lange | 206/346 |
| 3,904,032 A | 9/1975 | Maier | |
| 3,913,180 A | 10/1975 | Pray | |
| 3,944,068 A | 3/1976 | Maier et al. | |
| 3,955,674 A * | 5/1976 | Maier et al. | 206/347 |
| 3,990,343 A * | 11/1976 | Francois | 411/29 |
| 4,007,834 A * | 2/1977 | Borgersen | 206/338 |
| 4,018,334 A | 4/1977 | Lejdegard | |
| 4,033,456 A | 7/1977 | Wion et al. | |
| 4,212,094 A | 7/1980 | Pray | |
| 4,218,953 A | 8/1980 | Haytayan | |
| 4,258,461 A | 3/1981 | Pray | |

(Continued)

FOREIGN PATENT DOCUMENTS

DE 3332927 C1 4/1985

(Continued)

*Primary Examiner*—J. Gregory Pickett
(74) *Attorney, Agent, or Firm*—Fitch, Even, Tabin & Flannery (57) ABSTRACT

A rivet collating system is provided that includes a rivet holder for supporting rivets in a predetermined pattern. In one form, the rivet holder includes a unitary plate in which apertures are configured for supporting the rivets depending therefrom. In another form, the collating system includes a plate body and drive heads that are integrally connected via frangible portions to the plate body. Preferably, retaining webs are provided about the apertures to releasably hold the rivet heads therein. The drive heads are driven downward to sever the frangible portions with the webs flexing to release the rivet heads so that the rivets can be received in bores of a guide block of a belt fastener installation tool. A method of manufacture of the rivet holders is also disclosed.

19 Claims, 7 Drawing Sheets

U.S. PATENT DOCUMENTS

| | | |
|---|---|---|
| 4,333,217 A | 6/1982 | Pray |
| 4,344,213 A | 8/1982 | Pray |
| 4,349,106 A | 9/1982 | Bogel |
| 4,380,109 A | 4/1983 | Pray |
| 4,403,694 A | 9/1983 | Schmale |
| 4,684,022 A | 8/1987 | Potucek |
| 4,718,551 A | 1/1988 | Whitledge |
| 5,046,396 A * | 9/1991 | Pfister ..................... 89/35.01 |
| 5,244,088 A | 9/1993 | Musil |
| 5,366,082 A * | 11/1994 | Haytayan ..................... 206/343 |
| 6,116,835 A * | 9/2000 | Blacket et al. ............. 411/442 |
| 6,823,990 B2 * | 11/2004 | Gaudron ..................... 206/347 |
| 2004/0045136 A1 * | 3/2004 | Musil et al. ..................... 24/37 |

FOREIGN PATENT DOCUMENTS

| | | |
|---|---|---|
| EP | 565302 A2 * | 10/1993 |
| GB | 2156730 A | 4/1985 |

* cited by examiner

RIVET COLLATING SYSTEM INCLUDING RIVET HOLDER AND METHOD OF FORMING THE SAME

FIELD OF THE INVENTION

The invention relates to a collating system for rivets and, more particularly, a rivet holder and a method for forming the rivet holder.

BACKGROUND OF THE INVENTION

In using mechanical conveyor belt fasteners for splicing belt ends together, one problem lies in the time it takes for these to be installed on the belt ends. Normally, the fasteners, either of the solid-plate or hinged-loop variety, utilize attachment members such as rivets, staples or nails that extend through apertures in the upper and lower plates of the fasteners as well as through the belt carcass therebetween. Installation tools have been developed to assist in more rapidly driving the attachment members for connecting the belt fasteners to belt ends for splicing them together. One type of tool apparatus uses a guide block provided with several through bores arranged in a pattern corresponding to the pattern of apertures provided in the belt fastener plates. Rivets are loaded into the bores so that they are in proper aligned position relative to the belt fastener for installation. In this manner, several rivets can be simultaneously driven as by a gang driver saving installation time. Alternatively, the rivets can be individually driven with the guide block still saving time and providing accuracy as the installer does not have to manually align and hold the rivets as they are driven.

However, in either case described above, the rivets have to be individually loaded into the guide block bores slowing installation time accordingly. A further complication arises because the rivets in one form include a pilot nail detachably connected at the lower ends of each of the rivets. The pilot nails include sharp ends for piercing the conveyor belt and leading the rivet therethrough as it is driven for application of the belt fasteners to the belt ends. With a bucket full of loose rivet assemblies, the installer has to carefully reach into the bucket to avoid grabbing the sharp nail ends further slowing installation. Accordingly, to handle this problem in installation, applicants' assignee developed a rivet holder as shown in its U.S. Pat. No. 5,244,088, which is incorporated by reference as if reproduced in its entirety herein.

The rivet holder disclosed in the '088 patent has a body formed of two separable portions that come together along a non-linear interface or part line, so that the inner facing surface of the body portion cooperate to form apertures in which the rivets are held. The apertures are located in a pattern matching that of the guide block bores and belt fasteners. To load the guide block with the rivet assemblies, the holder is oriented so that the lower portions of the assemblies extend in the bores. Then, a manual force is applied to tabs upstanding from respective body portions to pivot the body portions apart and release the rivet assemblies so that they are loaded in the corresponding guide block bores.

The '088 patent rivet holder has been found to be extremely useful in reducing installation time at the belt splicing location since basically in the time it had taken to load a single rivet assembly into the guide block, the rivet holder can in substantially the same time permit multiple rivet assemblies to be loaded in the guide block. One shortcoming, however, with the above-described rivet holder is that it provides its body portions with a relatively complex shape especially at the inner facing surfaces extending non-linearly along the part line to form the apertures in which the rivets are held. This complexity in the parts of the rivet holder increases manufacturing costs associated therewith. Another shortcoming is that after the rivet holder is formed by releasably connecting the separable body portions together, the rivet assemblies still have to be inserted into the apertures formed by the releasably connected body portions in a separate manufacturing operation form the forming of the rivet holder body portions themselves. After inserting the rivet assemblies, the preformed rivet heads still remain outside of the apertures in the holder engaged against the upper surface thereof.

In addition, it has been found that although the body portions are releasably held together in a fairly secure manner invariably during shipping, there will be a certain relatively small number that are pivoted sufficiently so as to release some or all of their rivet assemblies. Also, the upstanding tabs make it difficult to stack the holders in a compact fashion in their shipping container. The relatively thick pivotal portions of the '088 patent rivet holder and having the rivet head protruding over the top surface of the rivet holder also increases the profile of the assembly thus increasing space requirements therefor during shipping.

Because the body portions separate after they are pivoted to release the rivets, an installer typically just allows these separate pieces to fall to the ground as they continue the rivet installation procedure. In addition, the pivoting action required for releasing the rivets effectively precludes anything but a single, separate rivet holder for each belt fastener. This requires an installer to have to go retrieve a number of the separate rivet holders corresponding to the number of belt fasteners that are to be applied across a belt end.

Accordingly, there is a need for a less complex rivet holder. In particular, a rivet holder that is more efficient and less expensive in its manufacture would be desirable. A rivet holder that does not inadvertently release rivets held thereby during shipping and permits for more compact stacking thereof would also be desirable.

SUMMARY OF THE INVENTION

In accordance with one aspect of the invention, a rivet holder is provided that has a unitary plate in which rivet holding apertures are formed. Accordingly, no longer do two separate body portions have to be formed, and thus the present rivet holder including the apertured unitary plate also avoids the necessity of forming complexly shaped facing surfaces along the interface between the body portions at which the apertures are formed as in the previously-described rivet holder of the '088 patent.

In another aspect, a rivet collating system is provided and includes a plate body for forming rivet-retaining apertures each having a drive head associated therewith. The drive heads are releasably connected to the plate body via frangible portions so that the drive heads can be driven relative to the plate body pushing the rivet heads out from the apertures. In one preferred collating system, a guide block is provided including guide bores that are aligned with the plate apertures so that the driven heads cause the rivet heads to enter the guide bores. Alternatively, it may be possible that the rivets be driven directly into rivet receiving apertures of a conveyor belt fastener rather than into the bores of an intermediate guide block.

It should be understood that although the term rivet or rivet assembly is used herein, the present invention is not so limited so that the term rivet encompasses other attachment members that could be used with conveyor belt fasteners as well, such as nails and possibly even staples.

In one form, the plate or plate body includes webs circumferentially spaced about each aperture and underlying each rivet head to retain the heads in the apertures. Preferably, a radially enlarged opening is formed between adjacent webs. In this manner, the webs are provided with a controlled flexibility so that driving the rivet heads via the drive heads deforms the webs causing the flexible webs to deflect allowing the rivet heads to pass out from the plate apertures.

In a preferred form, the plate body has a thickness and the frangible portions and webs are substantially within the plate body thickness to provide the rivet holder with a low profile.

In another form, the plate has a substantially flat upper surface, and the drive heads project above the plate upper surface. Preferably, the drive heads include an upper portion sized in interference with the associated aperture so that when the drive heads are driven to push the rivet heads out from the apertures, the drive heads will not pass through the plate body apertures. Alternatively, the drive heads are formed so that their upper surfaces are substantially level or flush with that of the remainder of the plate body.

In another aspect of the invention, a method of forming a rivet holder is provided including placing the rivets in the mold in which the rivet holder body is formed. In this manner, the rivet heads are releasably captured by plastic material of the rivet holder body as in incident of the molding of the rivet holder body. Thus, with the present method there is no need to take a separate, subsequent manufacturing operation to place the rivets in the rivet holder as in the prior rivet holder of the '088 patent.

DETAILED DESCRIPTION OF THE PREFERRED EMBODIMENTS

Figure 1:
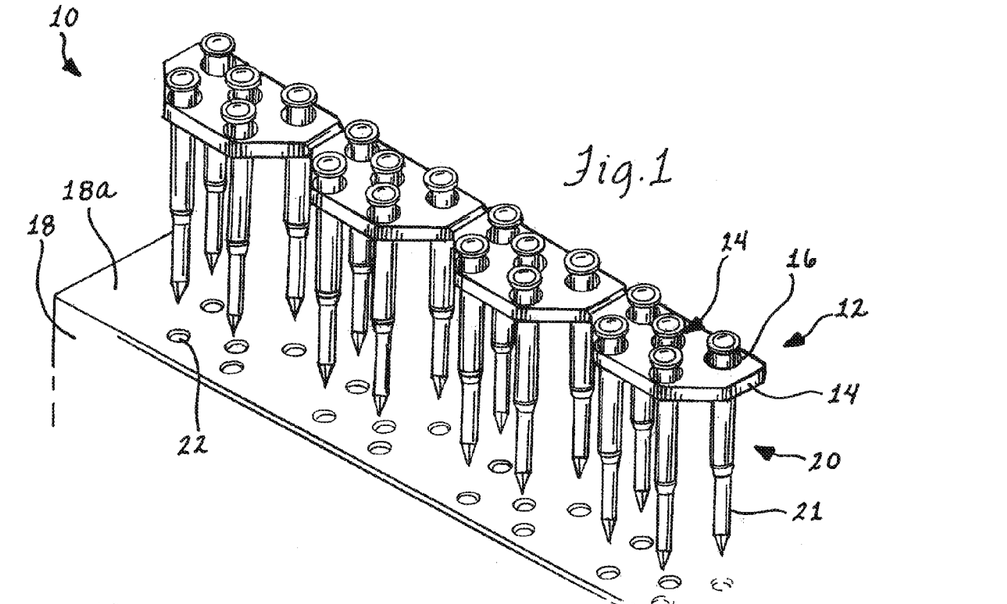
FIG. 1 is a perspective view of a rivet collating system in accordance with the present invention showing a strip of rivet holders for supporting rivets to be inserted in guide bores of a guide block.
Figure 2:
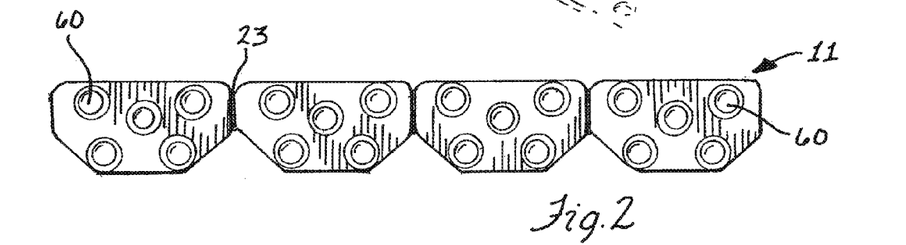
FIG. 2 is a plan view of the rivet holder strip showing drive heads of the rivet holders for driving of the rivets.
Figure 3:
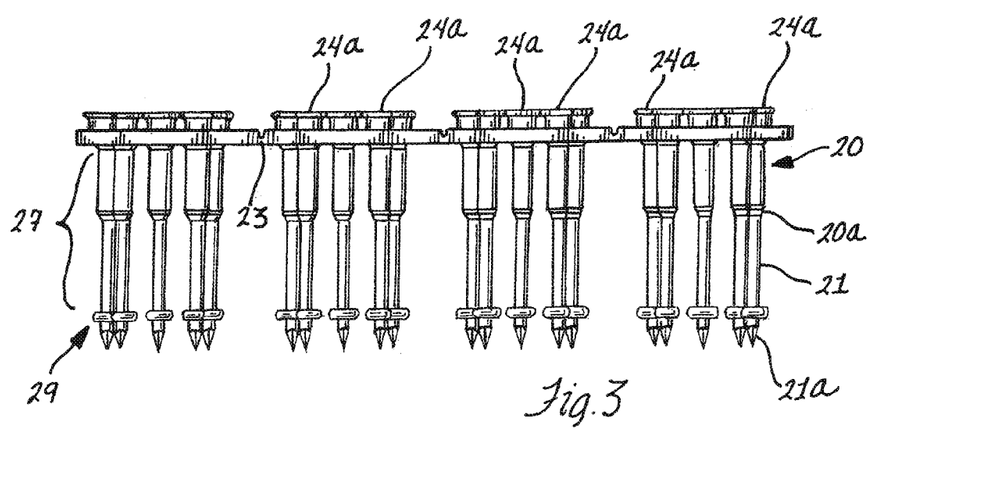
FIG. 3 is an elevational view of the rivet holder strip showing the drive heads raised above a plate body of each rivet holder.
Figure 4:
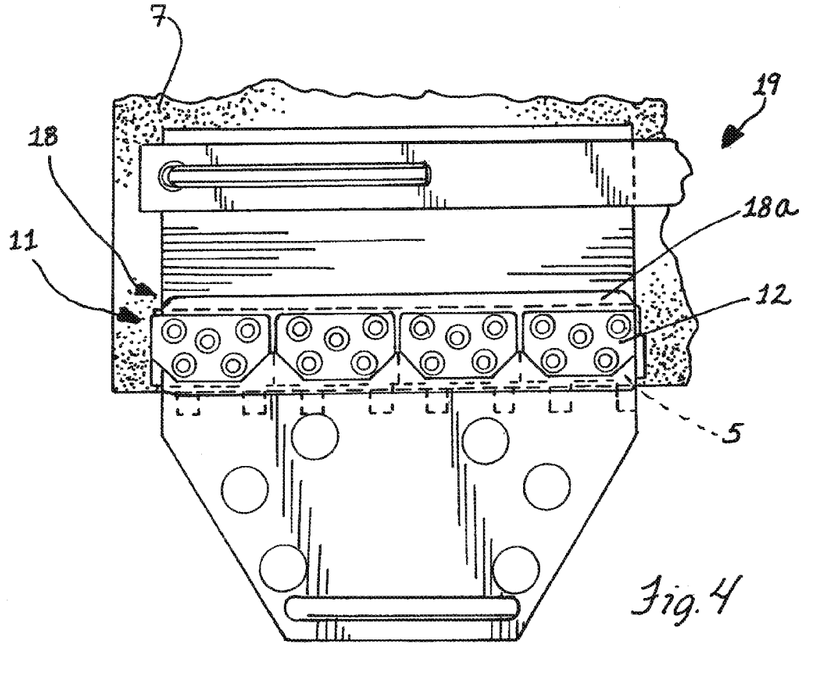
FIG. 4 is a plan view of an installation apparatus for applying belt fasteners to a conveyor belt showing the strip of rivet holders placed on the guide block for having the rivets received in the guide bores thereof.

In FIGS. 1-3, a rivet collating system generally designated 10 in accordance with the present invention is depicted. The rivet collating system 10 includes a strip 11 of rivet holders 12 with each holder 12 including a plate body 14 in which a plurality of apertures 16 are formed in a predetermined pattern. For instance, the rivet holders 12 can include the illustrated five-rivet pattern of apertures 16, for matching that of rivet receiving apertures such as in a belt fastener 5 or guide block 18 of installation apparatus 19 for applying the fasteners 5 to conveyor belt 7, as shown in FIG. 4.

The plate body apertures 16 are configured for supporting the rivets 20 so that all of the rivets 20 can be inserted into corresponding rivet receiving apertures therefor such as in guide bores 22 in a single insertion operation as opposed to having to individually insert the rivets as when they are not collated by a rivet holder such as present rivet holder 12. In the illustrated form, the rivets 20 are assemblies 27 of rivets 20 and pilot nails 21 that are detachably secured at the lower ends of the rivets 20 for leading the rivets 20 through the carcass of the conveyor belt 7 to which the fasteners 5 are to be attached.

In particular, in the strip form where the holders 12 are interconnected by frangible bridges or webs 23 between adjacent plate bodies, the strips 11 can be provided with a predetermined number of holders 12, e.g., four holders 12, such as corresponding to the number of belt fasteners 5 to be applied via the installation tool 19 at a particular location along the belt end. Referring to FIG. 4, the guide block 18 is preferably sized to fit over at least as many belt fasteners 5 as there are rivet holders 12 in a strip 11 so as to be able to receive each rivet holder 12 thereon. Accordingly, the strip 11 can be placed on the guide block 18 so that all rivet holders 12 are loaded on the guide block 18 in a single operation, rather than requiring each holder be individually loaded onto the guide block 18. In addition, the frangible bridges 23 are thinner than the plate bodies 14 to allow the strip 11 to be easily broken apart into one rivet holder 12 or two or three connected rivet holders 12, i.e., smaller strips 11, as may be required.

Figures 5, 6, 7, 8:
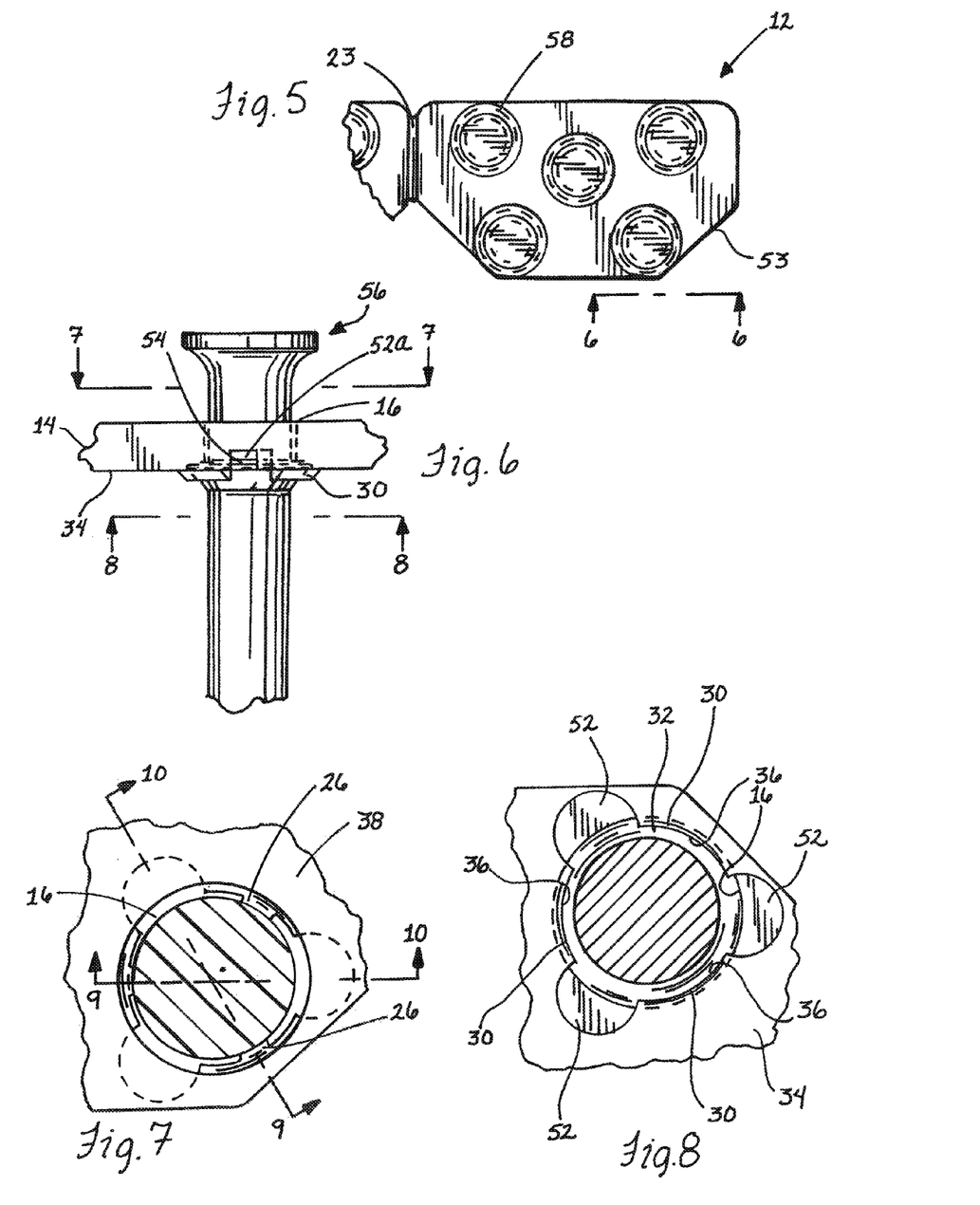
FIG. 5 is an enlarged plan view of one of the rivet holders.
FIG. 6 is an elevational view taken along line 6-6 of FIG. 5 showing webs of the plate body for supporting a head of the rivet in an aperture in the plate body.
FIG. 7 is a plan view, partially in section, taken along line 7-7 of FIG. 6 showing frangible portions integrally connecting the drive head to the plate body about the aperture.
FIG. 8 is a bottom plan view, partially in section, taken along line 8-8 of FIG. 6 showing the retaining webs circumferentially spaced from each other about the aperture by radially enlarged openings therebetween.
Figure 9:
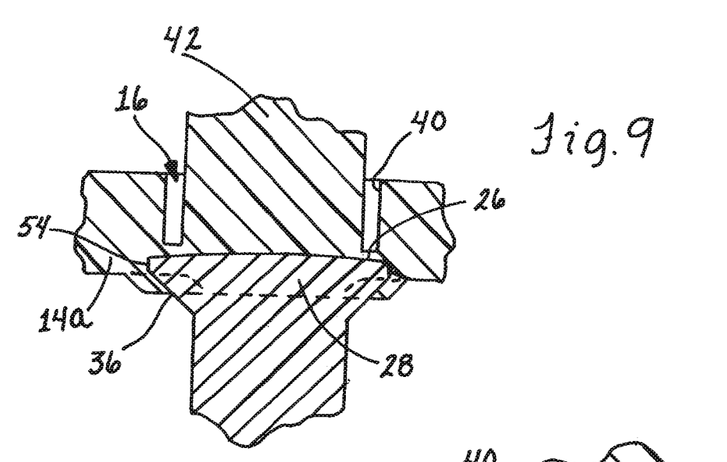
FIG. 9 is a cross-sectional view taken along line 9-9 of FIG. 7 showing the drive head overlying the rivet head that is captured between the frangible portions and the retaining webs.
Figure 11:
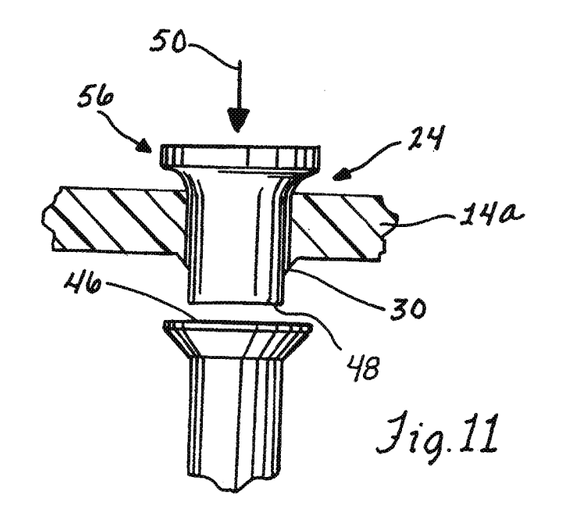
FIG. 11 is an elevational view of the drive head driven to push the rivet head out from the aperture.

The rivet holders 12 herein release the rivets 20 into the guide bores 22 via the use of drive heads 24 integrally and detachably connected to the rivet holder body 14. As shown in FIGS. 7 and 9, frangible portions 26 extend between the drive heads 24 and the body 14 of the rivet holder 12 interconnecting the drive heads 24 to the body 14. The drive heads 24 overlie rivet heads 28 in the apertures 16. Thus, impacting the drive heads 24 as with a hammer or mallet or even a power tool will cause the drive heads 24 to be severed from the rivet holder body 14 at the relatively small frangible portions 26 therebetween so as to push the heads 28 of the rivets 20 out from their respective apertures 16 in which they are releasably held, as shown in FIG. 11. The heads 28 can also be driven downwardly by a power press tool that generates sufficient downward force on the heads 28 to sever the frangible portions 26. In either case, an installer need not be holding or otherwise manipulating the strip 11 or rivet holder 12 as the drive force is applied to the holder heads 24 as they are completely supported on the upper surface 18a of the guide block 18 (FIG. 4) with the rivets 20 and/or pilot nails 21 extending into the bores thereof. The drive heads 24 connected to the plate body 14 by the frangible portion 26 also substantially prevent the rivets 20 from being pushed out upwardly from the apertures 16.

Referring to FIG. 3, the rivet assemblies 27 can each include a guide member 29 to keep the assemblies properly aligned in the bores 22 after released from their holders 12 for subsequently being driven through the plate fasteners apertures. The guide members can be in the form of annular washers 29 having an outer diameter slightly less than the diameter of the bores 22 so as to minimize skewing of the assemblies 27 as they are driven through and out from the bores 22. In this manner, the rivets 20 stay substantially aligned with the central axis of the bores 22 as the assemblies 27 are driven through the guide block bores 22, so that the rivets 20 properly travel through the aligned apertures in the plates of the belt fastener 5 below the guide block 18.

The washers 29 are preferably located toward the free end of the nails 21 as shown, e.g., up approximately ⅛ inch from the nail end 21a. This location provides the maximum distance between the rivet heads 28, which also serve to keep the assemblies 27 from skewing in the bores 22, and the guide washers 29. The inner diameter of the washer 29 is sized so that the washer 29 is frictionally held on the shank of the nail 21. As the nail 21 is driven through the upper plate aperture of the belt fastener 5, the washers 29 will engage on the fastener upper plate and slide along the nail 21 until the bottom end 20a is of the rivet 20 impacts the washer 29 causing it to break and fall off the rivet assemblies 27. Another washer could be provided along the bodies of the rivets 20 below the heads 28 thereof instead of or in addition to the washer 29 on the nails 21 for additional guided support of the assemblies 27.

With the use of the integral drive heads 24 to cause release of the rivets 20, the present rivet holder 12 does not require the two-piece construction as in the '088 patent rivet holder. Accordingly, it is preferred that the rivet holder plate 12 herein comprise a single piece such that the body 14 thereof is of unitary construction. The unitary plate body 14 is placed on the guide block 18 with its apertures 16 in alignment with the guide bores 22 so that the rivets 20 extend therein. At this time, the installer can release the rivet holder 12 so that it is only supported by the guide block 18 for driving the rivets 20 into the bores 22 via impacting the drive heads 24 as described earlier. After the rivets 20 have been driven out from their held state in the plate apertures 16, the plate body 14 stays on top of the guide block 18 so that they are readily accessible for being discarded as opposed to creating strewn about parts on the floor around the installation site.

Figure 13:
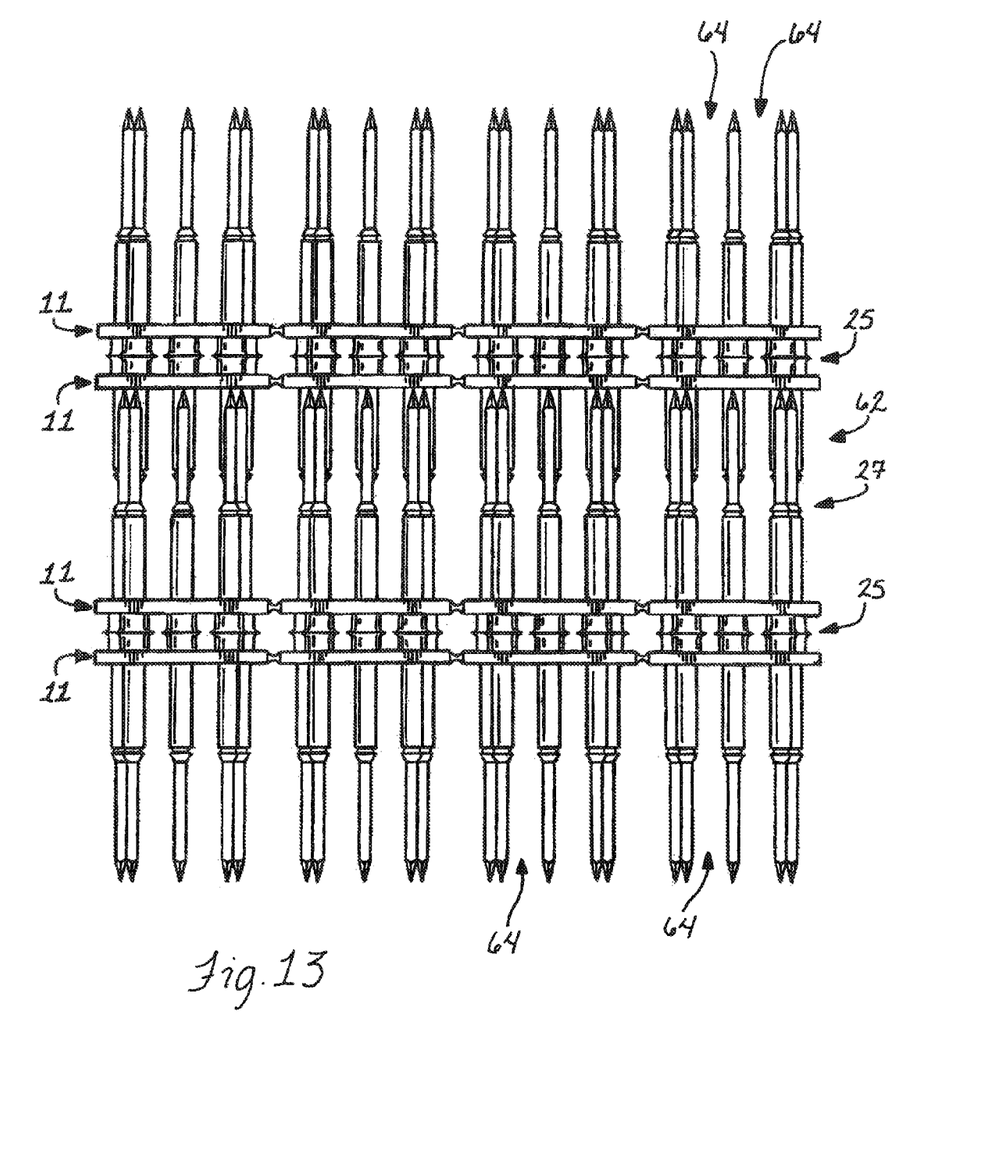
FIG. 13 is an elevational view of rivet holder strips showing a compact stacking arrangement therefor.

Referring to FIGS. 3 and 13, another advantage provided by the drive heads 24 is that their top surfaces 24a are aligned with each other so that they cooperate to allow for compact stacking of rivet strips 11 against each other at the respective drive head top surfaces 24a thereof. Together, the top surfaces 24a define a single plane that provides a predetermined stacking interface 25 between rivet holder strips 11. In particular, the distribution of multiple drive heads 24 about the holder 12 is such that the respective drive head surfaces 24a of different holders 12 will be able to be brought into substantially secure contact with each other at the interface 25, even if the plate bodies 14 are rotated by 180° relative to each other. In the alternative form where the drive head surfaces 24a are not raised, then manifestly there can be a substantially flat, single plane stacking surface provided on the rivet holders 12 with the drive heads surfaces 24a flush with the remainder of the plate body 14.

As previously mentioned, the apertures 16 are configured so that the rivet heads 28 are supported therein. For this purpose, the apertures 16 are configured to be in interference with the rivet heads 28 held therein. In the preferred and illustrated form, the material of the plate body 14 in interference with the rivet heads 28 includes webs 30 of material provided about the apertures 16. The rivet heads 28 include a lower generally conical surface 32 that extends at least partially into the aperture 16. Each aperture 16 preferably includes several arcuate webs 30 spaced circumferentially about the aperture 16 adjacent a lower surface 34 of the plate body 14 with the webs 30 being deflected slightly downward from the plate body lower surface 34 engaged along the head surface 36, as best seen in FIG. 9. The inner, arcuate edges 36 of the webs 30 about each aperture 16 define an effective lower diameter of the apertures 16 that is less than the diameter of the rivet heads 28 at the point where the edges 36 are engaged therewith along the conical surfaces 32 thereof.

The rivet holder body 14 is provided with a relatively low profile, even with the preferred upwardly projecting drive heads 24. In particular, the main plate body portion 14a of the rivet holder 12 from which the rivets 20 depend generally normal thereto can have a thickness that is kept to a minimum such as on the order of ⅛ inch between the lower surface 34 and upper surface 38 thereof. For this purpose, the rivet heads 28 can be received in the apertures 16 so as not to project beyond the body portion upper surface 38, and both the small frangible portions 26 and the retaining webs 30 can be disposed substantially within the thickness of the main plate body portion 14a, less the slight downward deflection of the webs 30 from the lower surface 34, as best seen in FIGS. 9 and 11. With the preferred sizes provided herein, the distance from the upper surface 38 of the main plate body portion 14a to the upper surface 24a of the drive heads 24 is approximately 3/16 inch.

In the preferred and illustrated form, the frangible portions 26 and the webs 30 are vertically spaced in the apertures 16 with the frangible portions 26 being above the webs 30. In addition to being vertically offset, the frangible portions 26 and the webs 30 can be in substantial alignment circumferentially about the apertures 16. Referring to FIGS. 7 and 8, it can be seen that the frangible portions 26 extend for a much shorter extent in the circumferential direction about the aperture 16 than do the retaining webs 30. As shown, the frangible portions 26 are generally centrally circumferentially aligned with the web 30 spaced therebelow. Accordingly, the frangible portions 26 and the webs 30 provide portions of the plate body 14a that are above and generally below the rivet heads 28, respectively.

Referring more specifically to FIG. 9, the apertures 16 include a generally annular surface 40 extending between the plate body surfaces 34 and 38. The drive heads 24 have a solid cylindrical body 42 having an outer surface 44 with a diameter sized smaller than that of the aperture surface 40 and spaced therefrom via the frangible portions 26. The diameter of the drive head outer surface 44 can be approximately the same as that of the webs 30 at the inner edges 36 thereof. The frangible portions 26 engaged on the top surface 46 of the rivet heads 28 such that the rivet heads 28 are captured between the frangible portions 26 at their top surface 46 and the flexible web portions 30 at their lower surface 32. The bottom 48 of the drive heads 24 is preferably configured to substantially match that of the rivet head surface 46 to be in flush engagement therewith. In the illustrated form, the drive head surface 48 has a slight concave configuration while the rivet head surface 46 has a slight convex configuration. With the retaining webs 30 engaged on the underside 32 of the rivet heads 28, there are portions of the main plate body 14a that are above and below the rivet heads 28 as captured in the aperture 16. More particularly, the frangible portions 26 are above the rivet heads 28, and the retaining webs 30 are generally below the rivet heads 28, and particularly the upper rivet head portion including the top surface 46 thereof residing in the apertures 16.

As previously discussed, the frangible portions 26 and webs 30 are generally aligned with each other circumferentially about the aperture 16, although the frangible portions 26 extend for a much smaller extent in the circumferential direction, than do the webs 30 so as to allow them to be readily severed upon application of an impact blow to the top of the drive heads 24 in the direction indicated by arrow 50 in FIG. 11. In the preferred and illustrated form, the frangible portions 26 and the webs 30 are equally spaced about the aperture 16. As shown, there are three small frangible portions 26 spaced 120° from each other about the aperture 16, and there are three corresponding retaining webs 30 that from their centers are spaced approximately 120° from each other, as well.

Figure 10:
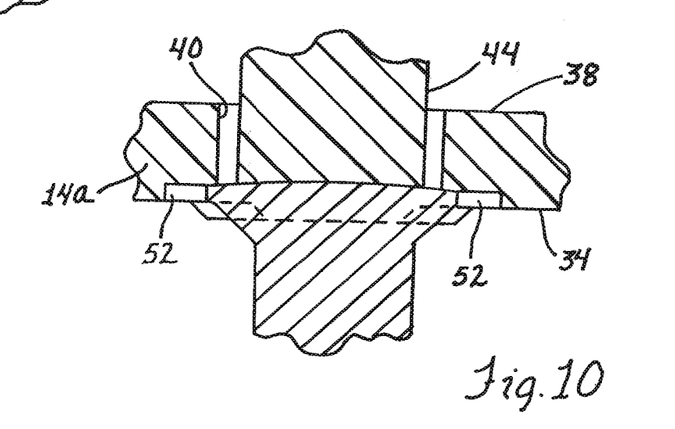
FIG. 10 is a cross-sectional view taken along line 10-10 of FIG. 7 showing enlarged openings about the rivet head.

In addition, the flexibility of the webs 30 is controlled by providing openings 52 therebetween, as best seen in FIGS. 8 and 10. The openings 52 are radially enlarged relative to the aperture 16. In other words, the openings 52 are recessed into the main body portion 14a of the rivet holder body 14 from the lower surface 34 thereof and radially beyond the aperture surface 40. As illustrated, the openings 52 extend in a generally circular fashion from the edges 36 of the webs 30 so that the openings 52 provide a radial enlargement of the aperture 16 between adjacent webs 30. In the illustrated holders 12 having a five-rivet pattern of apertures 16, the four apertures 16 adjacent to the peripheral edge 53 of the main plate body 14a will each generally include one of the recessed openings 52 that extends and opens to the edge 53 to form a vertical slot portion 52a of the opening 52 thereat, as can be seen in FIG. 6.

By selecting the size of the cut-out opening 52, the flexibility afforded to the webs 30 can be precisely controlled. In this manner, when the drive heads 24 are driven in the downward direction 50 via an impact blow, the impact force transmitted to the rivet heads 28 will be sufficient to deflect the webs 30 so that their edges 36 are in clearance with the upper, outer periphery 54 of the rivet heads 28 to allow the rivet heads 28 to pass out of the apertures 16. On the other hand, the openings 52 are sized so that absent a relatively large force as may be applied by an impact blow to the drive heads 24, the retaining webs 30 serve to securely hold the rivet heads 28 in their apertures 16. Also, as previously discussed, the overlying drive heads 24 and frangible portions 26 substantially hold the rivet heads 28 in their apertures 16 against movement upwardly toward the upper surface 38 of the body 14 of the rivet holder 12. In addition, the in situ molding of the rivet heads 28 in the apertures 16 can be such that the outer periphery 54 of the heads extends beyond the aperture surface 40 to provide further holding power against inadvertent upward shifting of the rivets 20 in the apertures 16, as can be seen in FIGS. 9 and 10. Accordingly, the rivet holders 12 herein are unlikely to have rivets 20 inadvertently released therefrom such as during transport and handling.

As previously mentioned, the drive head body 42 is sized in clearance with the aperture 16 by the spacing provided by the frangible portions 26 therebetween. Accordingly, upon severing of the frangible portions 26 via the impact force provided to the drive heads 24 in direction 50, the drive heads 24 travel downward through the aperture 16 without encountering interference from the annular aperture surface 40, except for the flexible retaining webs 30 provided at the bottom thereof. Where the drive heads 24 are raised relative to the upper surface 38 of the plate body portion 14a, the drive heads 24 preferably are provided with an upper portion 56 that is sized to be an interference with the aperture 16, and specifically the annular surface 40 thereof. In the illustrated form, the upper portion 56 is an enlarged annular flange 58 formed at the upper end of the drive head cylindrical body 42. The enlarged flange 58 is flared upwardly and outwardly from the drive head body 42 so as to form a recess 60 about which the flange 58 extends. Thus, when the drive heads 24 are impacted, they will not completely pass through the apertures 16, and instead will be stopped therein by the upper flanges 58 thereof engaged on the plate upper surface 38 about the upper end of the annular surfaces 40 of the apertures 16.

Figure 12:
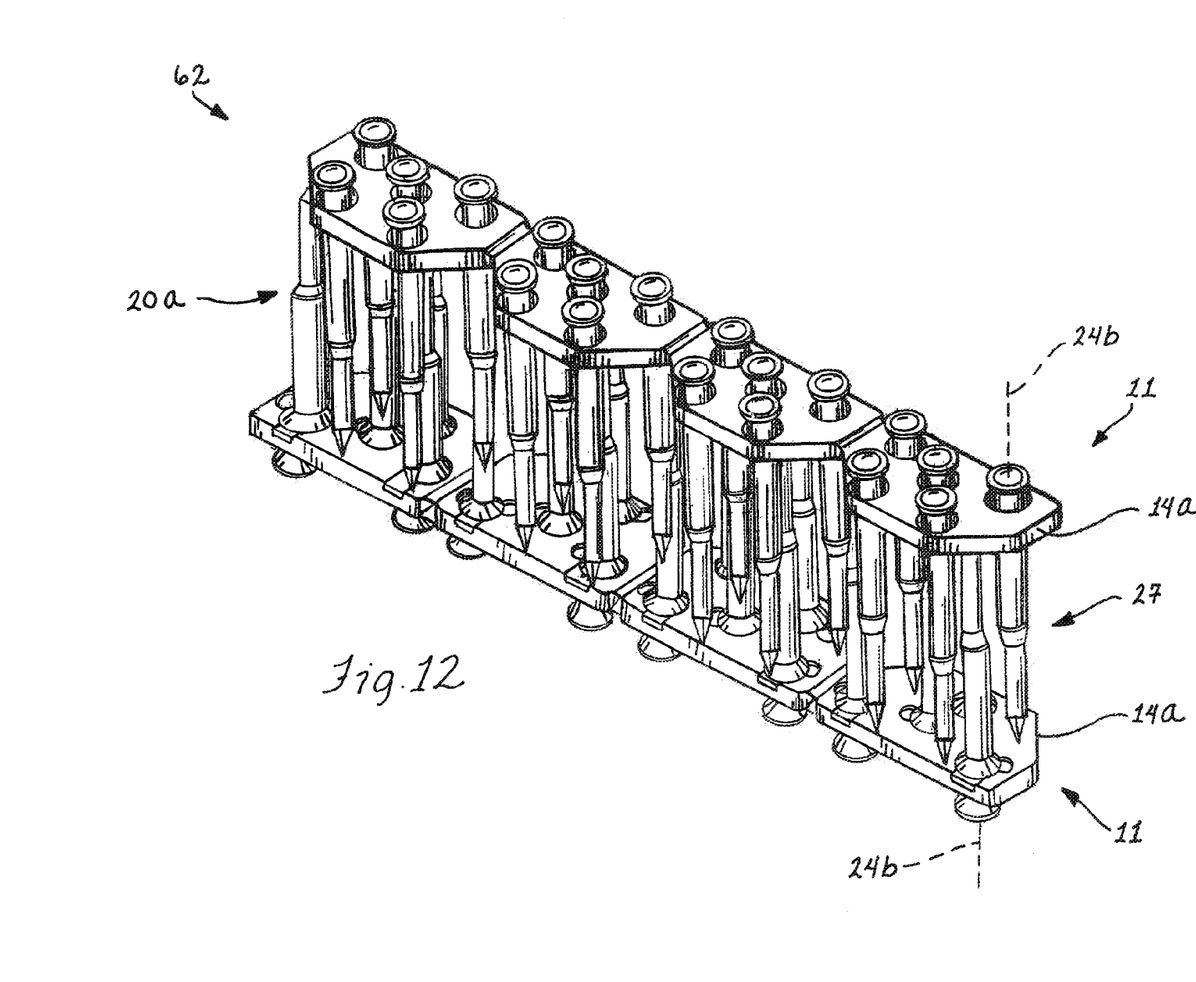
FIG. 12 is a perspective view of a set of two rivet holder strips with their plate bodies rotated 180° relative to each other so that rivets from one holder fit between rivets of the other holder.

As previously discussed, the flanges 58 all terminate at the same level so as to form the aligned top surfaces 24a of the drive heads 24 which cooperate to form a planar stacking interface 25 for compact stacking of adjacent strips 11 together. In addition, the annular configuration for the drive head surfaces 24a provides stability when strips 11 are stacked with the drive heads 24 engaging each other. More specifically, for stacking a set 62 or pair of rivet holder strips 11 can be arranged as shown in FIG. 12 with the respective plate bodies 14a rotated 180° relative to each other as shown. In this orientation, the rivet assemblies 27 of the holders 12 in the strips 11 facing each other extend toward each other so as to fit in gaps 64 between the five rivet assemblies 27 carried by each of the holders 12. Sets 62 can then be completely stacked in a shipping container or box in the orientation shown in FIG. 13 (one complete set 62 shown).

In FIG. 13, the adjacent strips 11 are arranged so that they are securely engaged along stacking interface 25 therebetween. The rivet holder bodies 14 of adjacent strips 11 are arranged in the same orientation so that the axes 24b of the engaging drive heads 24 are aligned. However, it is also possible to rotate the adjacent bodies 14 by 180° relative to each other with the strips 11 still being securely stacked along interface 25 therebetween as formed by the tops 24a of the drive heads 24 due to the distribution of drive heads 24 in the five-rivet pattern about the plate bodies 14 even though their respective axes 24b are now offset from each other. In addition, in either case, the drive heads 24 can stay securely engaged with each other at the stacking interface 25 since the heads 24 are provided with an annular configuration at their top surface 24a via the annular flange 56 thereof. In this manner, highly unstable and difficult to achieve point or line contact between the engaging heads 24 is avoided. Further, even if the heads 24 do not engage when the respective plate holder bodies 14 are rotated about the axes 24b relative to each other such as may occur in other rivet patterns that can be implemented with the holders 12 herein, they will have the flat upper surface 38 of the plate holders 14 at which they can be securely engaged. Manifestly, where the drive heads 24 are not raised relative to the plate bodies 14, the plate bodies 14 in stacked strips 11 can be securely engaged against each other along the substantially flat upper surfaces 38 thereof. Accordingly, the present rivet holders 12 allow compact stacking thereof along a planar stacking interface 25 so that plate bodies 14 in a strip 11 stay substantially in parallel orientation relative to the bodies 14 in another strip 11 stacked securely thereagainst.

Figure 14:
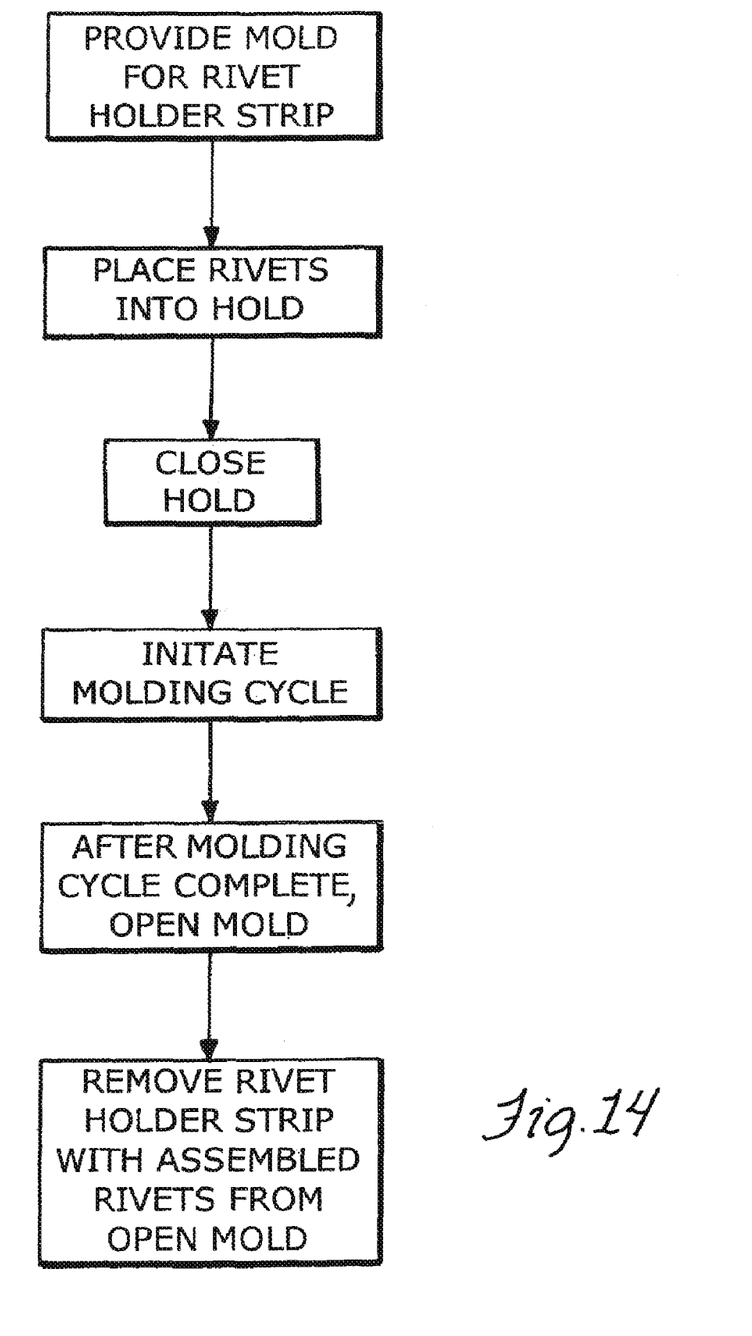
FIG. 14 is a flowchart diagram of a method of molding the rivet holder strip.

Referring next to FIG. 14, manufacture of the rivet holders 12 herein also can be done more efficiently than that of the prior two-piece pivotal rivet holder as the rivets 20, and specifically the rivet heads 28 thereof, are captured in the apertures 16 of the rivet holder 12 as the rivet holder 12 is molded.

To this end, the rivets 20 can be manually inserted into the mold for the rivet holder 12 at the locations where the apertures 16 are to be formed. Alternatively, this pre-molding step of rivet insertion in the mold can be automated. Thereafter, the molding operation begins with the mold closed and plastic material injected into the mold to form the plate body 14. After the molding cycle is complete, the mold is opened and completely formed rivet holder strips 11 are removed with the rivets 20 captured by the respective rivet holders 12 thereof so as to be in final assembly therewith. In this manner, there are no post-molding manufacturing operations that need to take place in terms of assembling the rivets 20 to the rivet holders 12 as in the prior two-piece rivet holders.

The rivet holders 12 or holder strips 11 can be molded with plastic material provided with a coloring agent. Different colored strips 11 can be provided, which can vary based on the number and size of rivets 20 supported by the holders 12 in the strip 11. In this regard, the molded rivet holders 12 are well-suited for being color-coded to differentiate one type of holder 12 from another.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A rivet holder comprising:
    a unitary plate body of a predetermined thickness and having an upper surface and a lower surface spaced by the predetermined thickness of the body;
    a plurality of rivets having preformed rivet heads including top surfaces that are aligned with each other; and
    a plurality of apertures of the unitary plate body configured to support the rivets depending from the plate body so that the top surfaces of the rivet heads do not project above the upper surface of the plate body, and the rivet head top surfaces are closer to the lower surface than the upper surface of the plate body,
    wherein the plate body has integral drive heads overlying the apertures.

2. The rivet holder of claim 1 wherein the plate includes frangible portions integrally connected to the drive heads about the apertures.

3. The rivet holder of claim 1 wherein the drive heads have substantially aligned top surfaces that cooperate to allow for compact stacking with drive head top surfaces from one rivet holder securely engaged against drive head top surfaces from another rivet holder.

4. A rivet holding system comprising:
    a plurality of interconnected unitary plates of a plastic molded material and each having an upper surface and a lower surface;
    a frangible bridge between adjacent plates;
    a plurality of rivets having rivet heads including top surfaces and lower surfaces thereof and
    a plurality of rivet-receiving apertures of the unitary plates configured to support the rivets depending from the plates with each plate having a predetermined non-linear pattern of rivet-receiving apertures which is the same as the predetermined non-linear pattern of rivet-receiving apertures in the other interconnected plates,
    wherein the plate includes portions that are molded above and generally below the heads of the rivets in the apertures to capture the heads therein so that the top surfaces thereof do not project above the plate upper surface, and the plate portions below the rivet heads comprise webs about each aperture spaced by a radially enlarged opening between adjacent webs so that the webs engage with the rivet heads from therebelow and against the lower surfaces thereof.

5. A rivet collating system comprising:
    a plurality of rivets each including an enlarged, preformed head at one end thereof;
    a plate body forming a plurality of apertures configured for retaining the rivet heads therein;
    a drive head associated with each of the plate apertures and including at least one frangible portion for releasably connecting the drive head with the plate body;
    a body of each of the drive heads sized in clearance with the associated plate aperture to allow the drive heads to be driven down into the corresponding apertures of the plate body with the frangible portion severed to push the rivet heads out from the apertures; and
    an upper portion of each of the drive heads sized in interference with the associated plate apertures to retain the downwardly driven drive heads in the associated aperture of the plate body.

6. The rivet collating system of claim 5 including a guide block having guide bores for the rivets with the plate apertures aligned with the guide bores and the driven drive heads causing the rivet heads to enter the guide bores.

7. The rivet collating system of claim 6 wherein the guide block is sized to fit over a plurality of conveyor belt fasteners, and the plate body includes a plurality of plate bodies connected in a strip for being associated with each belt fastener.

8. The rivet collating system of claim 5 wherein the plate body comprises a unitary body through which the apertures are formed.

9. The rivet collating system of claim 5 wherein the plate includes a substantially flat upper surface and the drive heads project upwardly above the plate upper surface for being engaged by a driver tool.

10. The rivet collating system of claim 9 wherein the rivet heads include a top surface that does not project above the plate upper surface.

11. The rivet collating system of claim 5 wherein the rivets each include a pilot nail detachably connected thereto.

12. The rivet collating system of claim 11 including a guide block having guide bores for receiving the rivets and nails, and a guide member on the pilot nail or rivet to keep the rivets aligned in the guide bores for being driven through belt fastener apertures.

13. The rivet collating system of claim 5 wherein the plate is of a plastic material that is molded with the rivets in place to capture the preformed heads in the apertures thereof.

14. A rivet collating system comprising:
    a plurality of rivets each including an enlarged, preformed head at one end thereof;
    a plate body forming a plurality of apertures configured for retaining the rivet heads therein; and
    a drive head associated with each of the plate apertures and including at least one frangible portion for releasably connecting the drive head with the plate body to allow the drive heads to be driven relative to the plate body to push the rivet heads out from the apertures,
    wherein the plate body includes circumferentially spaced webs about each aperture underlying each rivet head to retain the head in the aperture.

15. The rivet collating system of claim 14 wherein the webs include an opening between adjacent webs that extends beyond the aperture.

16. The rivet collating system of claim 14 wherein the plate frangible portions and the plate webs are vertically offset from each other.

17. The rivet collating system of claim 14 wherein the plate frangible portions engage on top of the rivet heads in the aperture and the webs engage under the rivet heads to capture the rivet heads in the aperture.

18. The rivet collating system of claim 14 wherein the plate body includes a predetermined thickness, and the plate frangible portions and the plate webs are substantially within the plate body thickness.

19. A rivet collating system comprising:
   a plurality of rivets each including an enlarged, preformed head at one end thereof;
   a plate body forming a plurality of apertures configured for retaining the rivet heads therein; and
   a drive head associated with each of the plate apertures and including at least one frangible portion for releasably connecting the drive head with the plate body to allow the drive heads to be driven relative to the plate body to push the rivet heads out from the apertures,
   wherein the drive heads each include an upper portion sized in interference with the associated aperture to keep the drive head from passing therethrough, and the drive head includes a cylindrical body extending up from the plate over the associated aperture, and the upper portion of the drive head comprises a flange at a free end of the cylindrical body and enlarged relative thereto.

* * * * *

UNITED STATES PATENT AND TRADEMARK OFFICE
CERTIFICATE OF CORRECTION

PATENT NO. : 7,654,389 B2  Page 1 of 1
APPLICATION NO. : 10/823878
DATED : February 2, 2010
INVENTOR(S) : Vogrig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 209 days.

Signed and Sealed this

Twenty-third Day of November, 2010

David J. Kappos
*Director of the United States Patent and Trademark Office*